United States Patent
Tsunetomo et al.

(10) Patent No.: US 7,407,889 B2
(45) Date of Patent: Aug. 5, 2008

(54) METHOD OF MANUFACTURING ARTICLE HAVING UNEVEN SURFACE

(75) Inventors: Keiji Tsunetomo, Tokyo (JP); Shinya Okamoto, Tokyo (JP); Yasuhiro Saito, Tokyo (JP); Junji Kurachi, Tokyo (JP); Akihiro Koyama, Tokyo (JP); Hirotaka Koyo, Tokyo (JP); Takeshi Hidaka, Tokyo (JP); Hiroaki Kasai, Tokyo (JP); Masamichi Hijino, Kitatsuru-gun (JP); Yasushi Nakamura, Kitatsuru-gun (JP)

(73) Assignees: Nippon Sheet Glass Company, Limited, Tokyo (JP); Olympus Corporation, Tokyo (JP)

(*) Notice: Subject to any disclaimer, the term of this patent is extended or adjusted under 35 U.S.C. 154(b) by 293 days.

(21) Appl. No.: 10/993,587

(22) Filed: Nov. 19, 2004

(65) Prior Publication Data

US 2005/0098539 A1    May 12, 2005

Related U.S. Application Data

(63) Continuation of application No. PCT/JP2004/002020, filed on Feb. 20, 2004.

(30) Foreign Application Priority Data

Mar. 3, 2003    (JP) ............................. 2003-056171

(51) Int. Cl.
*H01L 21/311* (2006.01)
(52) U.S. Cl. ........................... 438/694; 438/29; 438/32; 257/E21.002

(58) Field of Classification Search ................... 438/29, 438/32, 694; 369/275.4, 283, 286
See application file for complete search history.

(56) References Cited

U.S. PATENT DOCUMENTS

| 5,879,424 A | 3/1999 | Nishii et al. |
| 6,640,034 B1* | 10/2003 | Charlton et al. ............. 385/122 |
| 2002/0058463 A1 | 5/2002 | Kurachi et al. |
| 2003/0102286 A1 | 6/2003 | Takahara et al. |

FOREIGN PATENT DOCUMENTS

| JP | 6-80443 A | 3/1994 |
| JP | 9-309744 A | 12/1997 |
| JP | 2001-272505 A | 10/2001 |
| JP | 2002-160943 A | 6/2002 |
| JP | 2003-73145 A | 3/2003 |

* cited by examiner

*Primary Examiner*—Zandra Smith
*Assistant Examiner*—Christy L Novacek
(74) *Attorney, Agent, or Firm*—Hamre, Schumann, Mueller & Larson, P.C.

(57) ABSTRACT

The present invention improves a method of forming a surface unevenness using a difference in etching rates, and relaxes limitations on substrates in this method. In a method of the present invention, an uneven surface is formed by a method including applying pressure to a predetermined region in a surface of a thin film formed on a substrate, and etching a region including at least a portion of the predetermined region and at least a portion of the reminder of the surface that excludes the predetermined region. An etching rate difference within the thin film increases freedom in selecting a substrate material.

20 Claims, 9 Drawing Sheets

FIG. 11

METHOD OF MANUFACTURING ARTICLE HAVING UNEVEN SURFACE

This application is a continuation of international application PCT/JP2004/002020, filed Feb. 20, 2004, which application is incorporated herein by reference.

TECHNICAL FIELD

The present invention relates to a method of manufacturing an article having an unevenness on its surface utilizing a difference in etching rates. This technology is useful for, for example, in the manufacture of various kinds of micro devices.

BACKGROUND ART

There has been proposed a method of forming a surface having an unevenness by pressing parts of a surface of a glass substrate to form a compressed layer and subsequently etching the surface (JP 2002-160943A). With this method, depressions and projections are formed on the surface of the glass substrate due to an etching rate difference between the compressed portion (layer) and the remaining portion within the glass substrate. Use of this method makes it possible to impart minute projections and depressions over a wide surface area far more easily and more efficiently than using a photolithography technique.

However, there is a limitation on the types of substrates to which this method can be applied. The reason is that it is necessary for this method to form within a substrate a compressed layer whose etching rate is reduced to such a degree that projections can be formed. In JP 2002-160943A, a glass substrate containing $SiO_2$ and $Al_2O_3$ is disclosed as a substrate suitable for the above-mentioned method.

DISCLOSURE OF THE INVENTION

It is an object of the present invention to relax the limitations on the substrate in a method of forming a surface having an unevenness by utilizing an etching rate difference.

The present invention provides a method of manufacturing an article, including the steps of: applying pressure to a predetermined region of a surface of a thin film formed on a substrate, and etching a region including at least a portion of the predetermined region and at least a portion of a remainder of the surface that excludes the predetermined region.

The present invention basically utilizes an etching rate difference in the thin film on the substrate, not in the substrate. Accordingly, limitations on substrate materials become less strict than conventional in the methods of forming an unevenness utilizing an etching rate difference.

BEST MODE FOR CARRYING OUT THE INVENTION

In the present invention, pressure is applied to a portion of a thin film to produce a part having a varied etching rate under predetermined etching conditions, and by using the etching rate difference in the etching according to the above-mentioned predetermined etching conditions, a projection or a depression is formed on a surface of an article.

In a manufacturing method of the present invention, the surface having an unevenness may be formed of only a thin film material by controlling the etching so that only the thin film is etched away; or alternatively, the etching may proceed further and the etching may be continued until a portion of the substrate is exposed. If the etching conditions are adjusted so as not to etch the substrate, it is possible to form a projection made of only the thin film material.

In a manufacturing method of the present invention, the etching may be continued until at least a portion of the substrate is removed. In this case, it is possible to form, on the substrate, a projection formed of a thin film material and a substrate material, that is, a projection provided with the thin film. Moreover, the etching may be continued until the thin film is removed from the region subjected to the etching. This makes it possible to form a projection formed of only the substrate material.

Any types of thin film materials may be used as long as an etching rate difference is accomplished; however, an inorganic thin film, particularly an oxide thin film, is suitable as a thin film, as it is chemically stable and its etching rate is easy to control. Use of an inorganic thin film improves, for example, thermal stability of a surface having an unevenness.

Although the inorganic thin film is not particularly limited, an oxide thin film containing $SiO_2$ is preferable, and an oxide thin film further containing at least one selected from $B_2O_3$ and $Al_2O_3$ in addition to $SiO_2$ is especially preferable. The inclusion of $B_2O_3$ and $Al_2O_3$ increases the etching rate difference when using an acidic etchant. Fluorine, $GeO_2$, or the like may be added to the oxide thin film containing $SiO_2$ as appropriate in order to control various properties thereof. It is preferable that the inorganic thin film be amorphous.

Another preferable example of the inorganic thin film is a $SiO_2$ thin film. As represented by this thin film, an amorphous film that does not contain modified oxides such as alkali metal oxides or that contains very little modified oxides exhibits a greater density change as a result of the application of pressure.

In the present specification, even if an organic substance is mixed in the thin film, the thin film is regarded as an inorganic thin film as long as the thin film is mainly composed of an inorganic substance (specifically, the content of inorganic substance exceeds 50 mass %).

The present invention may be embodied using a substrate on which a thin film is formed in advance, or may be embodied as a method further including a step of forming a thin film on a substrate. The thin film can be formed by various conventionally-known methods, such as a vapor deposition method, a sputtering method, a sol-gel method, and a liquid phase deposition method. Although it is sufficient if the thin film is made of a single layer, the thin film may have a layered structure including two or more layers, or may have a gradient composition in which the composition changes gradually along the thickness direction. Use of the layered structure and the gradient composition makes it possible to finely adjust the etching rates.

If the thin film is too thin, it is readily removed by etching and thus a high projection cannot be formed; therefore, it is preferable that the film thickness of the thin film be 100 nm or greater, or more preferably 500 nm or greater. On the other hand, if the thin film is too thick, the amount of the thin film to be etched increases or the unevenness produced due to the portion having a varied etching rate may become blunt, particularly in the case where at least a portion of the surface of the substrate is to be exposed. Taking this into consideration, it is preferable that the film thickness of the thin film be 100 μm or less, and especially preferably 10 μm or less.

In the present invention, it is not necessary to form a portion that produces an etching rate difference within the substrate. For this reason, limitations imposed on the substrate material are less strict.

The substrate material may be glass, ceramic, semiconductor, or resin. Preferable examples of the glass include quartz glass, soda lime glass, aluminosilicate glass, crystallized glass, low expansion glass, and athermal glass; preferable examples of the ceramic include alumina; preferable examples of the semiconductor include Si and GaAs; and preferable examples of organic material include PC (polycarbonate) and PMMA (polymethyl methacrylate).

It should be noted that when at least a portion of the substrate should be removed along with the thin film by etching, it is recommended to select a substrate composed of a material that can be etched under predetermined etching conditions applied to the etching of the above-mentioned region. When selecting such a substrate material that the etching rate of the substrate is higher than the etching rate of the thin film under the above-mentioned predetermined etching conditions, a high projection can be formed easily.

The most simple and convenient way of applying pressure partially to the thin film is partial pressing of the surface of the thin film. It is recommended that the partial pressing be performed using, for example, an indenter. It is preferable to use a high hardness material such as diamond for the tip of the indenter. It is possible that the indenter merely may be pressed against a predetermined region of the surface of the thin film, but it also is possible that while the indenter is being pressed against the surface of the thin film, the surface of the thin film and the indenter may be shifted relatively to apply pressure to a predetermined region of the thin film. This makes it possible to form a portion having a varied etching rate along the track of the indenter.

It also is possible that while two or more indenters are being pressed against the surface of the thin film, the two or more indenters and the surface may be shifted relatively. This makes it possible to form an unevenness, for example, in a striped shape after etching. Thus, it is recommended that the range in which pressure is applied partially be selected as appropriate according to the desired shape of unevenness.

For example, when shifting the surface of the thin film and the indenter relatively so that tracks of the indenter intersect in the surface of the thin film, it is possible to form a part having a varied etching rate in a frame or lattice shape. In this case, because the region in which tracks of the indenter intersect (intersection region) is pressed two or more times, there is a possibility that the etching rate of the intersection region may change further locally. However, by controlling the pressure appropriately, it is possible to make the change of the etching rate in the intersecting region substantially the same as the change of the etching rate in the other pressed region than this intersection region.

If the pressure is small, the degree of change in the etching rate is influenced by the magnitude of the pressure. However, the present inventors have found through an experiment that the change of etching rates becomes substantially constant when the magnitude of the pressure is greater than a predetermined value. More specifically, when the pressure is less than a predetermined value, the rate of change of etching rates ($1-E_p/E_o$; where $E_p$ is an etching rate after applying pressure and $E_o$ is an etching rate before applying pressure) becomes larger as the pressure increases, whereas when the pressure is equal to or greater than the predetermined value, the rate of change of etching rates becomes substantially constant. Thus, by shifting the indenter while applying pressure equal to or greater than the predetermined value, it is possible to equalize the changes in the etching rates between the region that is pressed two or more times and the region that is pressed only one time, and thus to make substantially equal the heights of the projections after the etching.

Application of pressure to the thin film may be performed using a member having two or more indenters, such as a die. Use of this member improves the production efficiency in mass production.

It also is possible to apply pressure to the thin film while heating the substrate. Heating reduces the tendency for the substrate and the thin film to break. Therefore, it becomes easy to form the part having a varied etching rate so as to reach a deep part in the thin film. This makes it easy to obtain a high projection.

Pressing of the surface of the thin film may be carried out by other means than the indenter. It is possible to press the surface partially by supplying at least one selected from particles and a liquid to a portion of the surface of the thin film, as represented by a wet blasting method and a sand blasting method. The wet blasting method is a method in which particles dispersed in a solution, such as loose abrasive grains, are impacted onto a predetermined area of the surface of a member at a high pressure. The sand blasting method is a method in which particles such as loose abrasive grains along with an air stream are impacted onto the surface of a member at a high pressure. It also is possible to produce etching rate differences randomly by using the characteristics of these blasting methods. It also is possible that the thin film may be irradiated with a laser to scatter a portion of the thin film (abrasion), and the reaction thus obtained may be applied as a pressure. In the case of using an indenter, the indenter may be pushed in using ultrasonic waves.

Although there are no limitations on the kind of etching as long as a difference is produced in etching rates, wet etching normally is employed. The etching solution (etchant) may be acidic or alkaline; preferable examples of the former include an etchant containing at least one kind selected from sulfuric acid, nitric acid, hydrochloric acid, sulfamic acid, acetic acid, and hydrofluoric acid, and preferable examples of the latter include an etchant containing at least one kind selected from potassium hydroxide, sodium hydroxide, and ammonia.

The etchant may be selected as appropriate taking the material to be etched or the like into consideration; however, for example, in the case of etching a thin film containing $SiO_2$, an etchant composed of hydrofluoric acid with which nitric acid, ammonium fluoride, and the like is mixed as appropriate is suitable.

It should be noted that in the present specification the term "etching" is meant to include any of wet etching, dry etching, and combinations thereof (for example, an etching in which wet etching is performed and thereafter dry etching is performed).

In addition, another etching (for example, dry etching) may be conducted before or after the method of the present invention is conducted by a particular etching (for example, wet etching).

For example, it is possible in the foregoing method that after forming an unevenness on a surface of an article by wet etching, a step of further dry etching the surface may additionally be carried out to manufacture an article having a surface unevenness. In this case, after the wet etching is performed to such a degree that the thin film remains in at least a portion of the surface, the surface is recessed by dry etching to such a degree that the thin film is removed, so that the surface having an unevenness is formed of the substrate material.

The region to be etched may be the entirety of or a portion of the surface of the thin film. In the case of the latter, it is possible that the region may be etched in a state in which at least a portion of an outer periphery of the region to be etched is defined by a resist.

The present invention encompasses an article obtained by the method explained above.

Hereinbelow, a method of the present invention is described for purposes of illustration with reference to the drawings.

Figure 1A:
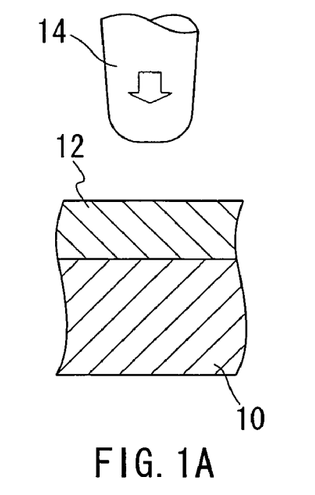
FIGS. 1A to 1H are process drawings showing one embodiment of the present invention, each of which shows a cross section in the vicinity of a surface in each step.
Figure 1B:
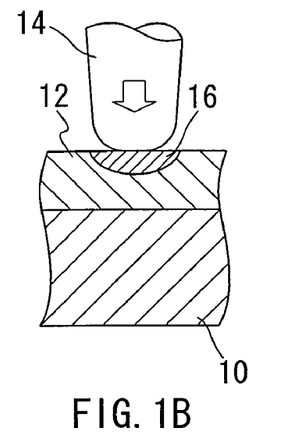
Figure 1C:
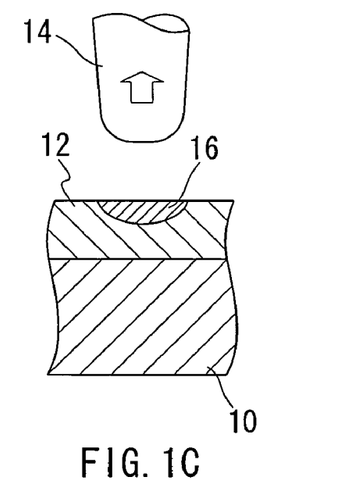
Figure 1D:
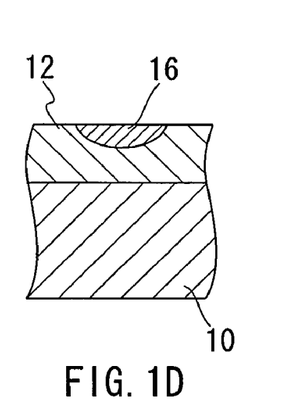
Figure 1E:
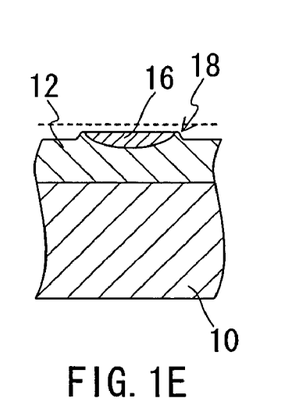

First, a thin film 12 is formed on a substrate 10 (FIG. 1A), and then an indenter 14 is brought into contact with a portion of a surface of the thin film 12 to press the surface of the thin film partially by the indenter 14 (FIG. 1B). Thus, an influence due to stress is caused on a portion 16 of the thin film. Even after the indenter 14 is taken away and the stress is released (FIG. 1C), the influence of the stress remains partially on the thin film (FIG. 1D). Herein, the portion in which the influence of the stress remains and the etching rate has changed is referred to as "an influence-remaining portion" 16.

Unlike the embodiment as illustrated in the figures, there are cases in which after the indenter 14 is taken away a dent that has been formed with the pushed indenter remains on the surface of the thin film. Moreover, the influence-remaining portion 16 may be formed deeper than in the embodiment illustrated in the figure, for example, so as to include a portion of the substrate 10. A deep influence-remaining portion is advantageous in forming a high projection. In the influence-remaining portion 16, for example, a deformation is caused in the internal structure, or for example, the composition of the material is changed locally. The influence-remaining portion 16 may be a compressed layer in which the material is compressed by pressing.

Figure 1F:
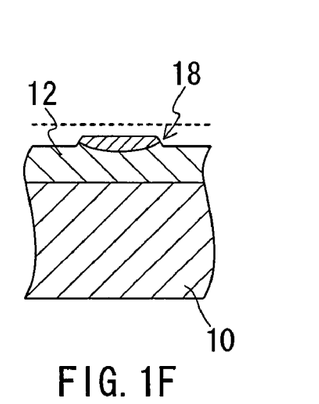

Next, the substrate 10 on which the thin film is formed is wet etched from the surface side of the thin film 12 (FIGS. 1E to 1H). In general, the rate of removing the surface of the thin film 12 becomes smaller in the region in which the influence-remaining portion 16 is formed than that of the surroundings because the etching rate becomes relatively smaller in the influence-remaining portion 16. For this reason, as the etching proceeds, minute projections 18 appear on the thin film (FIG. 1E), the projection 18 gradually becomes higher (FIG. 1F).

Figure 1G:
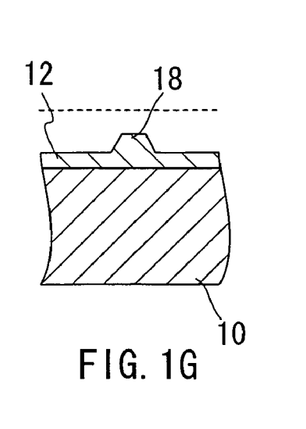
Figure 1H:
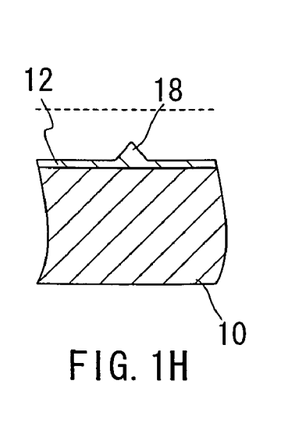

When the etching proceeds further and the influence-remaining portion 16 is removed (FIG. 1G), the cross-sectional shape of the projection 18 generally changes from substantially a trapezoid to a triangle, an arc shape, an elliptical arc shape, or the like (FIG. 1H). By making use of this fact, the etching may be stopped at a stage at which the projection 18 has become a desired shape. It should be noted, however, that when the influence-remaining portion 16 is removed, the etching rate difference is eliminated, and accordingly, the projection 18 may become smaller as the etching proceeds. Generally, in order to obtain a high projection 18, it is preferable to stop the etching at a stage just after the influence-remaining portion 16 is removed (FIG. 1G).

Figure 2A:
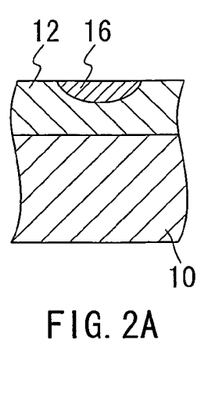
FIGS. 2A to 2D are partial process drawings showing another embodiment of the present invention, each of which shows a change in cross-sectional shape in the vicinity of a surface, associated with the progress of etching.
Figure 2B:
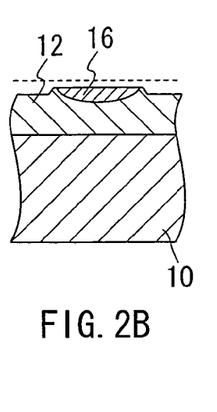
Figure 2C:
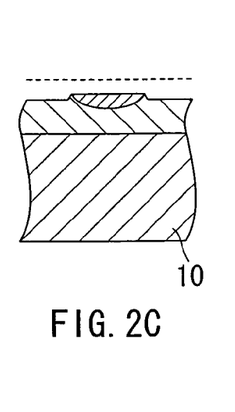
Figure 2D:
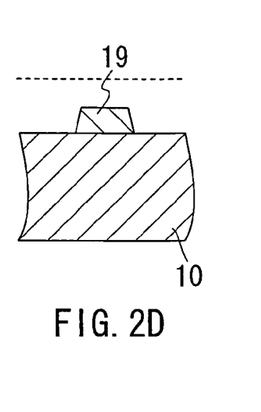

In the present invention, the shape of the surface having an unevenness can be adjusted by selecting the thickness and composition of the thin film, the method of pressing, the conditions of etching, and so forth. For example, according to the method shown in FIGS. 2A to 2D, a projection 19 made of only the thin film material is formed on a substrate 10, and the surface of the rest of the region (depression) is formed of the substrate material (FIG. 2D).

Figure 3A:
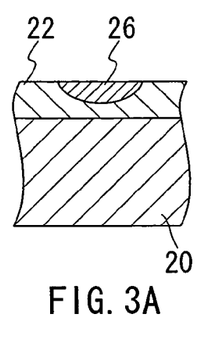
FIGS. 3A to 3D are partial process drawings showing yet another embodiment of the present invention, each of which shows a change in cross-sectional shape in the vicinity of a surface, associated with the progress of etching.
Figure 3B:
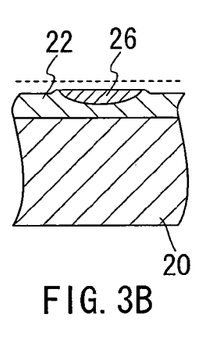
Figures 3C, 3D:
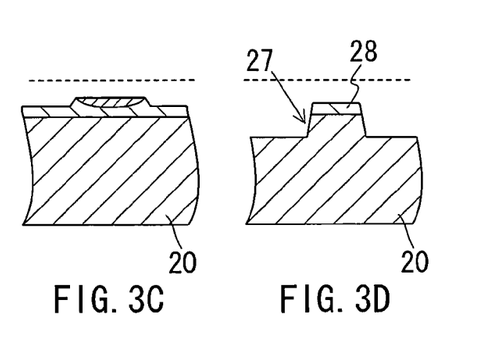

In addition, for example, according to the method shown in FIGS. 3A to 3D, a projection 27, a portion of which is made of a thin film material 28 and the remainder of which is made of a substrate material, is formed on a substrate 20, and the surface of the other region is formed of the substrate material (FIG. 3D). With this method, the height of the projection 27 can be increased when the etching rate of the substrate 20 is larger than the etching rate of the thin film 22.

Figure 4A:
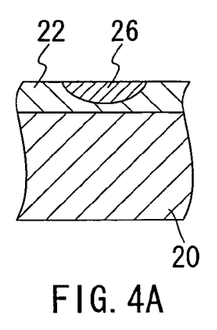
FIGS. 4A to 4D are partial process drawings showing still another embodiment of the present invention, each of which shows a change in cross-sectional shape in the vicinity of a surface, associated with the progress of etching.
Figure 4B:
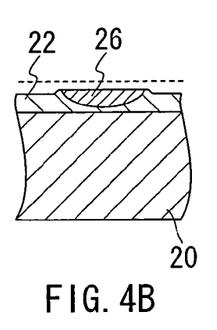
Figures 4C, 4D:
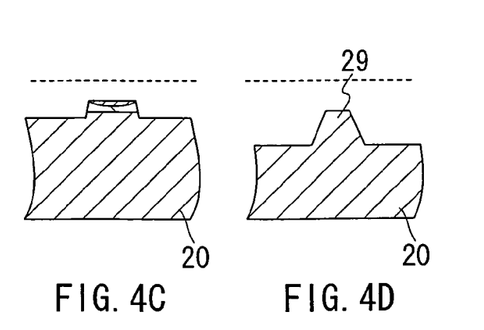

In addition, for example, according to the method shown in FIGS. 4A to 4D, a projection 29 made of only the substrate material is formed on a substrate 20, and the surface of the other region also is formed of the substrate material (FIG. 4D). In this method as well, it is preferable that the etching rate of the substrate 20 is larger than the etching rate of the thin film 22.

When a surface made of only the substrate material is required, it is possible that the projection 27 shown in FIG. 3D is formed and the thin film material 28 is removed from the projection 27. This removal may be carried out by mechanical polishing, etching using an etchant that attains a higher etching rate for the thin film material than the etching rate for the substrate material, or the like.

Figure 5A:
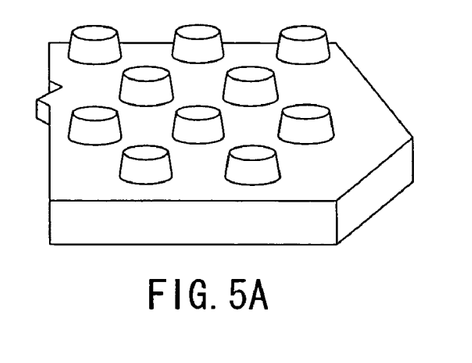
FIGS. 5A to 5G are perspective views, each of which illustrates a shape of projection that can be manufactured by the present invention.
Figure 5B:
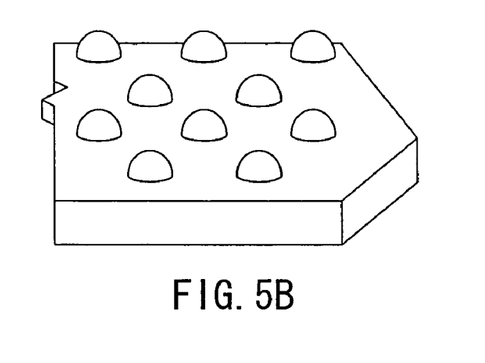
Figure 5C:
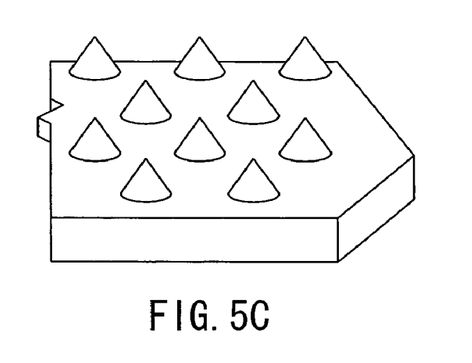
Figure 5D:
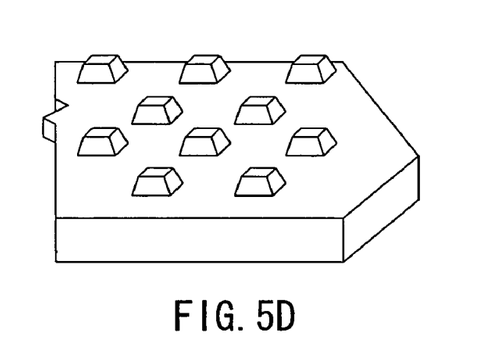

Projections having a variety of shapes can be formed by selecting various conditions. For example, by pressing with two or more indenters at the same time, or by pressing with one indenter sequentially, it is possible to form a plurality of projections having a truncated cone shape (FIG. 5A), a hemispherical or semi-spheroidal shape (FIG. 5B), a cone shape (FIG. 5C), or a prismoidal shape (FIG. 5D).

Figure 5E:
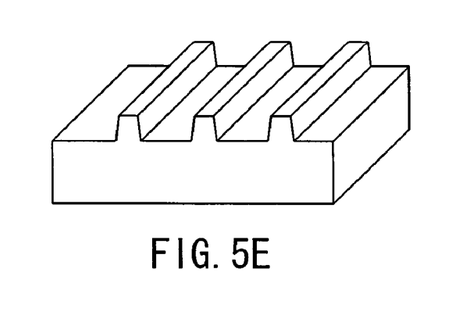
Figure 5F:
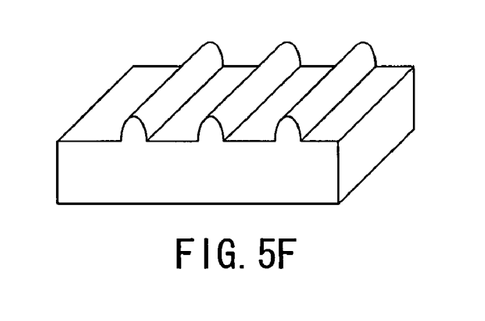
Figure 5G:
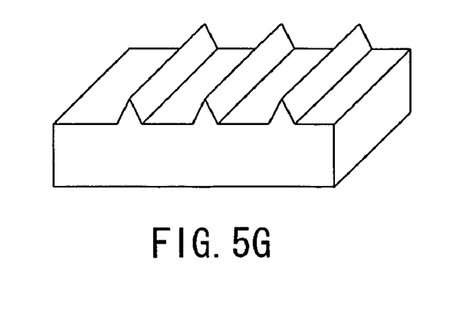

When two or more indenters are shifted while pressing them against the surface of the thin film, ridge-like shaped projections can be formed (FIGS. 5E to 5G). In this case as well, the transversal cross-sectional shape of the ridges can be controlled to be a trapezoid (FIG. 5E), a semi-ellipse (FIG. 5F), a triangle (FIG. 5G), or the like, by adjusting etching conditions or the like as appropriate. These projections also may be formed by shifting one indenter sequentially.

According to the present invention, it is possible to form minute projections at desired locations easily. Although not particularly limited, the projections described above may have, for example, a height of about 10 nm to 10 μm and the bottom face thereof may have a minimum length of about 100 nm to 20 μm.

Hereinbelow, a variety of devices that can be manufactured by utilizing the present invention is described for purposes of illustration. According to the present invention, minute surface textures can be formed efficiently, and therefore, by using this, a variety of optical devices, micro chemical chips, and the like can be manufactured efficiently.

Figure 6A:
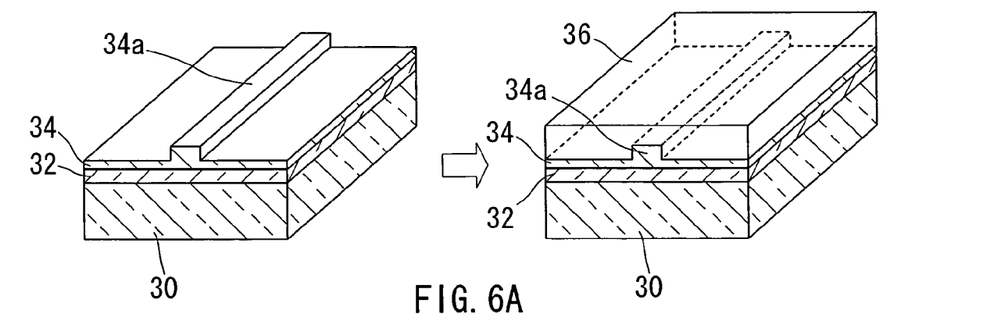
FIGS. 6A and 6B are perspective views, each of which illustrates an optical waveguide that can be manufactured by the present invention.
Figure 6B:
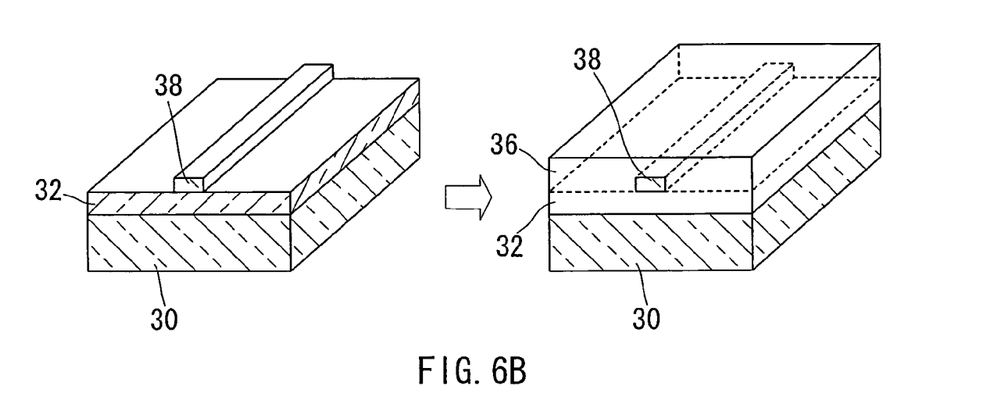

FIG. 6 shows an example of an optical waveguide. In a ridge waveguide shown in FIG. 6A, a cladding layer 32 is formed on a substrate 30, and a core layer 34 is arranged thereon. The projection (core portion) 34a of the core layer can be formed by pressing and etching the core layer under the conditions that attain the embodiment shown in FIG. 1. After forming the projection 34a, the cladding layer 36 is formed. Likewise, in a buried waveguide shown in FIG. 6B, a core layer 38 should be formed under the conditions that attain the embodiment shown in FIG. 2. This waveguide may be formed by applying the conditions that attain the embodiment shown in FIG. 3, in other words, by slightly etching the cladding layer 32. In these waveguides, light propagates while being contained in the core.

Figure 7:
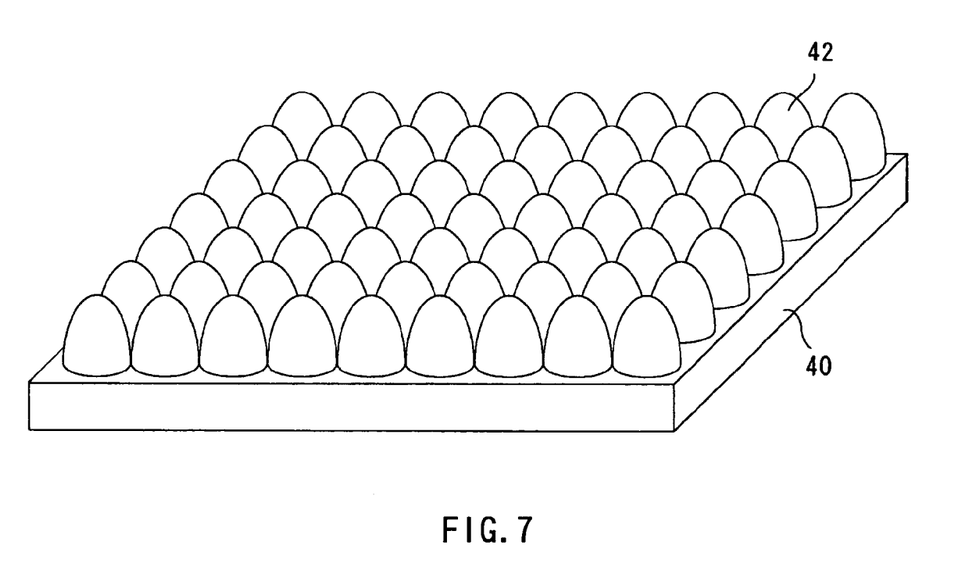
FIG. 7 is a perspective view illustrating a low-reflection member that can be manufactured by the present invention.

A low-reflection member shown in FIG. 7 has a moth-eye structure. In this member, a multiplicity of projections 42 is regularly arranged on a surface of a thin film on a substrate 40. Herein, an example is shown in which the cross-sectional shapes of the projections 42 are substantially the same semi-elliptical shape. The light incident on this surface is diffusely reflected by the projections 42, and as a result, the reflectivity in a particular direction can be reduced to almost zero. The projections 42 may be arranged in an irregular manner, and their shapes need not be the same. Such a surface structure can be formed easily by further etching using, for example, a wet blast method or a sand blast method.

Figure 8:
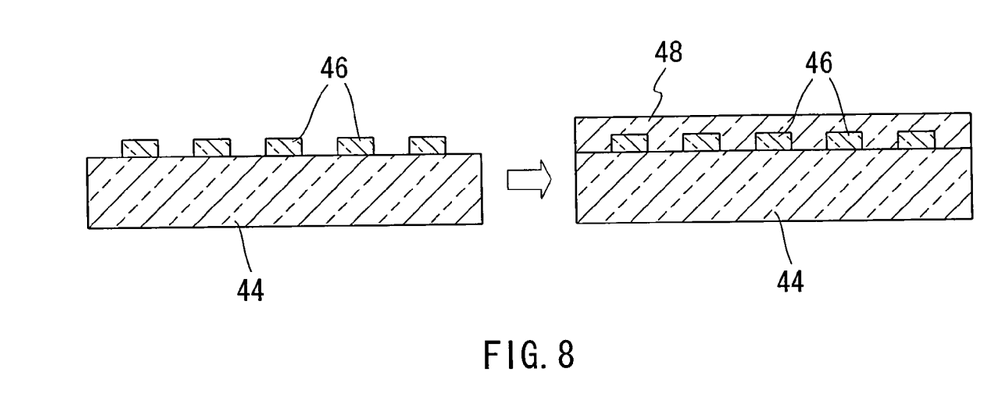
FIG. 8 is a cross-sectional view illustrating an arrayed waveguide that can be manufactured by the present invention.

In the arrayed waveguide shown in FIG. 8, cores 46 are formed in a striped shape on a quartz substrate 44, and a cladding layer 48 is formed so as to cover the cores 46. The cores 46 can be formed by shifting two or more indenters that are pressed against a film made of a core material at predetermined intervals in the same direction, forming stripe-shaped influence-remaining portions in this film, and thereafter performing an etching treatment reaching the quartz substrate 44 (see FIG. 2).

Figure 9A:
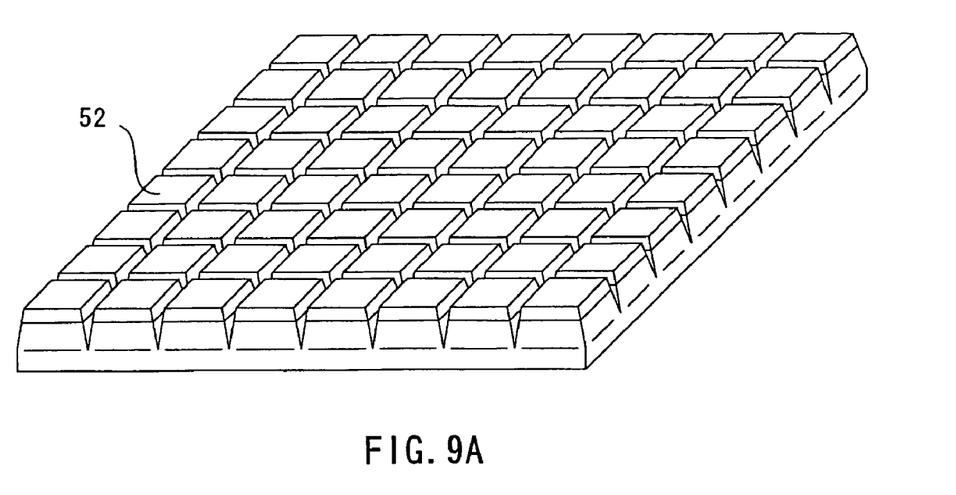
FIGS. 9A and 9B are perspective views, each of which illustrates a microprism that can be manufactured by the present invention.
Figure 9B:
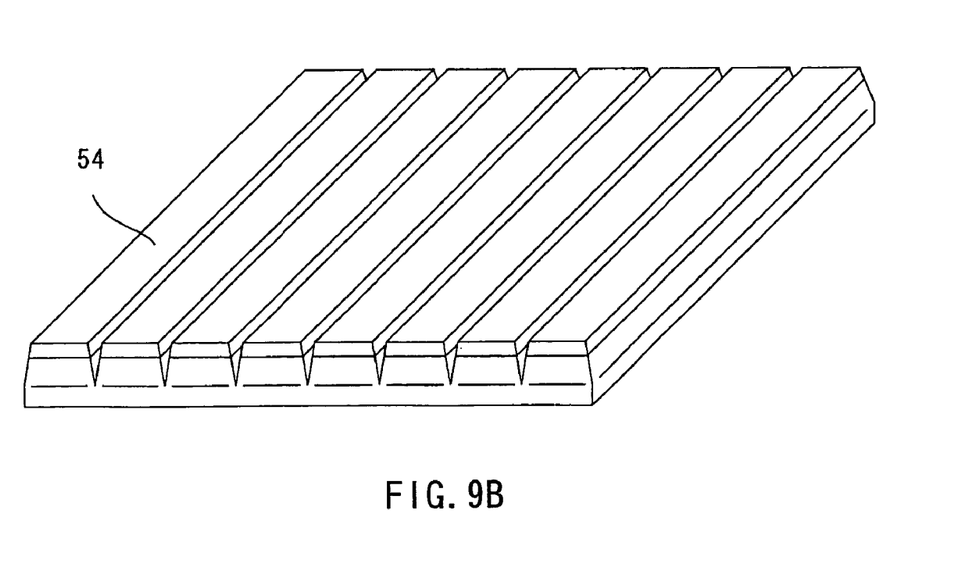

In a microprism shown in FIG. 9, prismoidal projections 52 having a square-shaped bottom face are aligned in a matrix (FIG. 9A), or prismoidal projections 54 having a rectangular bottom face are lined up (FIG. 9B). If the substrate is made of glass and projections 52 or 54 having a thin film in their portions are formed (see FIG. 3), it is possible to allow the projections to have a filter function. All the projections may be constituted by a substrate material (see FIG. 4). These microprisms can express the function to restrict exiting angle, the function to deflect the light beam that exits therefrom again, and so forth.

Figure 10A:
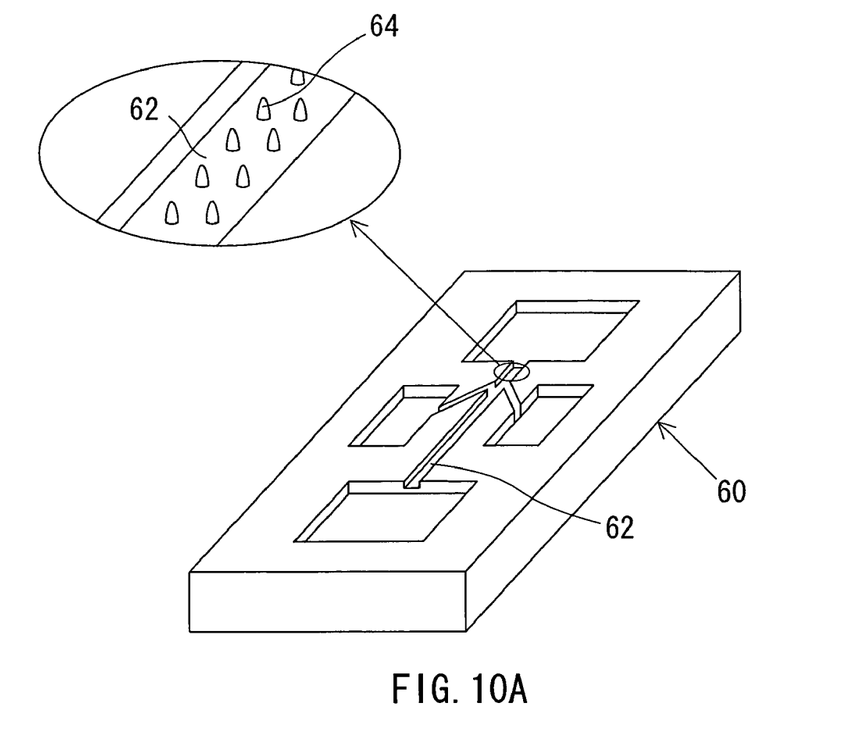
FIG. 10A is a perspective view illustrating a micro chemical chip that can be manufactured by the present invention.

In a micro chemical chip 60 shown in FIG. 10, depressions or grooves 62 are formed so that various chemical operations are possible (FIG. 10A). The grooves 62 are extremely narrow (for example, with a width of 10 μm to 100 μm), and the amount of solution that flows through the grooves 62 is accordingly extremely small. The solution is difficult to flow because of the increased flow path resistance due to the effect of surface tension or the like. The flow path resistance can be reduced when minute projections 64 are disposed in grooves 62.

Figure 10B:
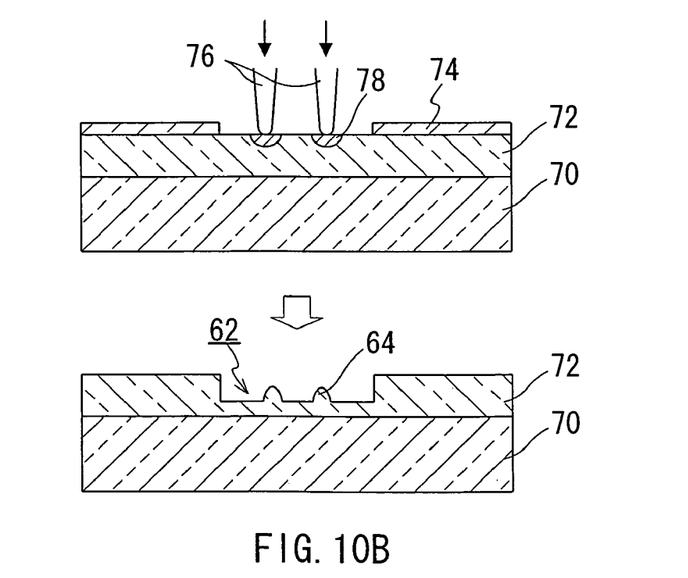
FIG. 10B is a cross-sectional view illustrating one example of manufacturing steps thereof.

Here, an example is shown of a manufacturing method for the chip, which is combined with a photolithography technique (FIG. 10B). First, a thin film 72 composed of a material that is chemically stable against a solution or the like to be used is formed on a substrate 70, and a resist 74 having openings at the locations corresponding to the grooves or the like is formed on the thin film 72 in a predetermined pattern. Further, an indenter 76 is pushed in an opening region whose outer periphery is defined by the resist 74, to form in the thin film 72 an influence-remaining portion 78 in which the etching rate is reduced. Subsequently, an etching treatment is carried out, which etches the opening region and forms a groove 62, and simultaneously a projection 64 is formed.

The method of the present invention is not limited to the above-described examples, but may be applied to manufacturing a variety of micro devices, such as diffraction gratings, Fresnel lenses, photonic crystals, and the like.

EXAMPLES

Example 1

A $SiO_2/Al_2O_3$ film was formed on a quartz glass substrate by a sputtering method. The conditions of the sputtering method were set as follows: the Ar flow rate was $3.3 \times 10^{-7}$ $m^3/s$ (20 ccm), the $O_2$ flow rate was $1 \times 10^{-7}$ $m^3/s$ (6 ccm), and the deposition duration was 30 minutes. The film composition was Si:Al=54.16:45.84, represented by atom %, and the film thickness was 650 nm.

Using an indenter having a tip made of diamond with a radius of curvature of 5 μm, a load of about 30 mN (about 3 g) was applied to the surface of the thin film, whereby a minute processing mark was formed. The depth of the processing mark was measured using a noncontact three-dimensional measurement apparatus, and it was found that the depth was about 60 nm.

The surface of the thin film on which the processing mark was formed was subjected to wet etching using a 0.1% concentration hydrofluoric acid under the conditions of 50° C. and 5 minutes. The etch amount was 170 nm in the region in which there was no influence of pressing by the indenter. The surface was observed using a noncontact three-dimensional measurement apparatus, and it was found that a projection having a trapezoidal cross section was formed at the location of the processing mark. The height of the projection was 18.7 nm, the diameter at the top of the projection was about 20 μm, and the diameter at the bottom thereof was about 25 μm. The etch amount was 91.3 nm at the location of the processing mark, and it is understood that the etching rate was reduced to about 54% because of the pressing of the indenter.

Example 2

A surface having an unevenness was formed in the same manner as Example 1 except that the etch amount was 650 nm in the region in which there was no influence of pressing. In this surface, it was found that a projection having a trapezoidal cross-section and made of $SiO_2/Al_2O_3$, which was the thin film material, was formed on the quartz glass substrate which was exposed. The height of the projection was 300 nm, and the diameter of the bottom was about 25 μm.

Example 3

A surface having an unevenness was formed in the same manner as Example 1 except that an aluminosilicate glass substrate was used in place of the quartz glass substrate and the etch amount was 800 nm in the region in which there was no influence of pressing. In this surface, a projection that has a substantially trapezoidal cross section was formed on the aluminosilicate glass substrate which was exposed, and the upper part of the projection was made of a thin film material whereas the lower part thereof was made of a substrate material. The height of the projection was 700 nm, and the diameter of the bottom was about 25 µm.

Example 4

A surface having an unevenness was formed in the same manner as Example 3 except that the indenter that applies a load was shifted. First, an operation in which the indenter is swept about 2 mm in a predetermined direction while applying a load of about 30 mN was repeated 10 times, thus forming 10 streaks of processing mark that are parallel to each other. The interval between the streaks was 150 µm. Next, a similar sweeping operation was repeated 10 times in a direction perpendicular to the above-mentioned predetermined direction, thus forming a group of streaks of processing marks intersecting in a lattice-shape.

Figure 11:
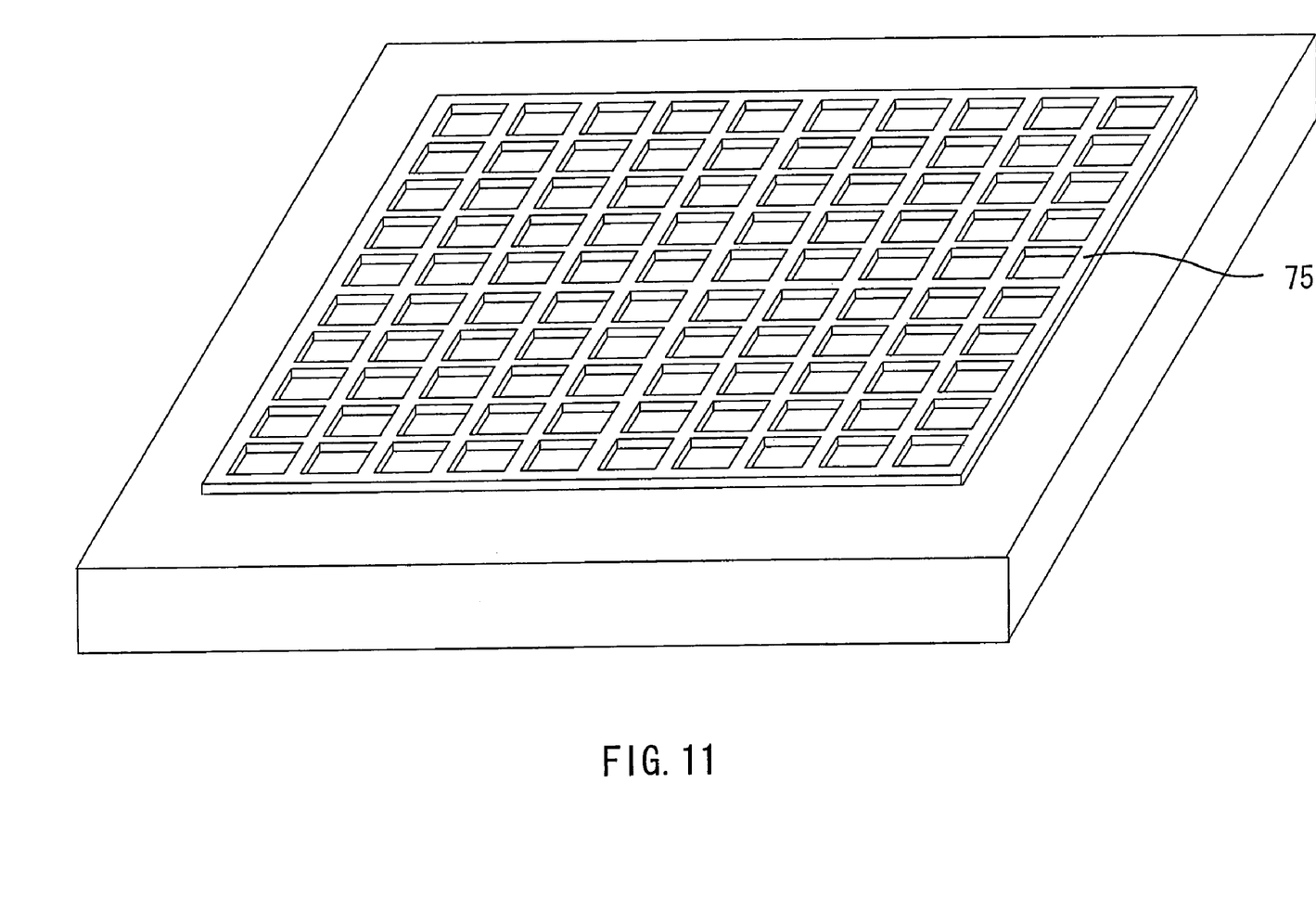
FIG. 11 is a perspective view showing the shape of a surface made in accordance with one example.

The obtained surface is illustrated in FIG. 11. A lattice-like shaped projection 75 was formed having almost a uniform height even in the intersection regions.

INDUSTRIAL APPLICABILITY

According to the present invention, a surface unevenness is formed by utilizing an etching rate difference within a thin film, and therefore, freedom in selecting a substrate material is greater than conventional in the methods of forming an uneven surface utilizing the above-mentioned difference. The present invention has great usefulness as it provides a method of manufacturing optical devices, micro chemical chips, and the like efficiently.

The invention claimed is:

1. A method of manufacturing an article having a surface unevenness, comprising:
    applying pressure to a predetermined region of a surface of an inorganic thin film formed on a substrate; and
    etching a region including at least a portion of the predetermined region and at least a portion of a remainder of the surface that excludes the predetermined region.

2. The method of manufacturing an article as claimed in claim 1, wherein only the inorganic thin film is subjected to the etching.

3. The method of manufacturing an article as claimed in claim 1, wherein the etching is carried out until at least a portion of the substrate is removed.

4. The method of manufacturing an article as claimed in claim 1, wherein the etching is carried out until the inorganic thin film is removed from the region.

5. The method of manufacturing an article as claimed in claim 1, wherein the inorganic thin film is an oxide thin film comprising $SiO_2$.

6. The method of manufacturing an article as claimed in claim 5, wherein the oxide thin film further comprises at least one selected from $B_2O_3$ and $Al_2O_3$.

7. The method of manufacturing an article as claimed in claim 1, wherein the substrate is glass, ceramic, semiconductor, or resin.

8. The method of manufacturing an article as claimed in claim 1, wherein the substrate is composed of a material that can be etched under predetermined etching conditions applied to the etching of the region.

9. The method of manufacturing an article as claimed in claim 8, wherein the etching rate of the substrate is higher than the etching rate of the inorganic thin film under the predetermined etching conditions.

10. The method of manufacturing an article as claimed in claim 1, wherein, while pressing an indenter against the surface of the inorganic thin film, the surface of the inorganic thin film and the indenter are relatively shifted, whereby pressure is applied to the predetermined region.

11. The method of manufacturing an article as claimed in claim 10, wherein, while pressing two or more indenters against the surface of the inorganic thin film, the surface of the inorganic thin film and the two or more indenters are shifted relatively.

12. The method of manufacturing an article as claimed in claim 10, wherein, the surface of the inorganic thin film and the indenter are shifted relatively so that tracks of the indenter intersect in the surface of the inorganic thin film.

13. The method of manufacturing an article as claimed in claim 1, wherein pressure is applied partially to the inorganic thin film using a member having two or more indenters.

14. The method of manufacturing an article as claimed in claim 1, wherein the region is wet etched.

15. The method of manufacturing an article as claimed in claim 1, wherein the region is etched in a state in which at least a portion of an outer periphery of the region is defined by a resist.

16. A method of manufacturing an article having a surface unevenness, further comprising dry etching the surface after forming an unevenness on the surface of the article by the method as claimed in claim 14.

17. The method of manufacturing an article as claimed in claim 1, wherein the thickness of the inorganic thin film is 100 nanometers or more.

18. The method of manufacturing an article as claimed in claim 1, wherein the substrate is resin or ceramic.

19. The method of manufacturing an article as claimed in claim 1, further comprising determining the pressure to apply based on a desired etching rate of the predetermined region.

20. A method of manufacturing an article having a surface unevenness, comprising:
    applying pressure to a predetermined region of a surface of an inorganic thin film formed on a substrate;
    etching a region including at least a portion of the predetermined region and at least a portion of a remainder of the surface that excludes the predetermined region, the etchant comprising hydrofluoric acid; wherein
    the etching rate of the inorganic thin film with the etchant is reduced by the step of applying pressure to the surface of the inorganic thin film.

* * * * *